United States Patent [19]

Lauer et al.

[11] 4,009,962
[45] Mar. 1, 1977

[54] EMISSION SPECTROSCOPIC SYSTEM HAVING COMPENSATION FOR BACKGROUND RADIATION

[75] Inventors: James L. Lauer, Penn Wynne; Melvin E. Peterkin, Brookhaven, both of Pa.

[73] Assignee: Sun Oil Company of Pennsylvania, Philadelphia, Pa.

[22] Filed: Oct. 3, 1975

[21] Appl. No.: 619,270

[52] U.S. Cl. .............................. 356/82; 250/341; 356/51; 356/70; 356/106 S
[51] Int. Cl.² ........................................... G01J 3/36
[58] Field of Search ................. 356/51, 70, 81, 82, 356/106 S; 250/337, 339, 341; 73/64

[56] References Cited
UNITED STATES PATENTS 3,753,619  8/1973  Thorpe et al. .................. 356/106 S Primary Examiner—Vincent P. McGraw
Attorney, Agent, or Firm—J. Edward Hess; Donald R. Johnson; William C. Roch

[57] ABSTRACT

A spectroscopic system for measuring the discontinuous far infrared radiation emitted by a semi-transparent material, and including compensation for background, graybody, emitted radiation.

In a first embodiment, a system is disclosed for measuring the far infrared radiation emitted by a lubricant in contact with a steel ball under high pressure. The lubricant is coated on a small diamond disc mounted as a window in a steel plate. The steel ball is rotated over the window to form a sliding elastohydrodynamic (EHD) contact region with the lubricant. Some of the radiant energy generated in the contact region, both in the fluid and at its boundaries, passes through the window into an infrared interferometer, which generates an emission spectrum. The spectrum is separated, by a balancing technique utilizing a rotating chopper blade, into contributions from the fluid and contributions from the steel ball.

In a second embodiment, the emission spectrum of a geochemical fossil, such as kerogen, is measured by similar apparatus. The infrared radiation emitted from organic matter in the fossil is separated from graybody radiation emitted by other elements in the fossil by the same radiation balancing technique utilized in the first embodiment.

18 Claims, 4 Drawing Figures

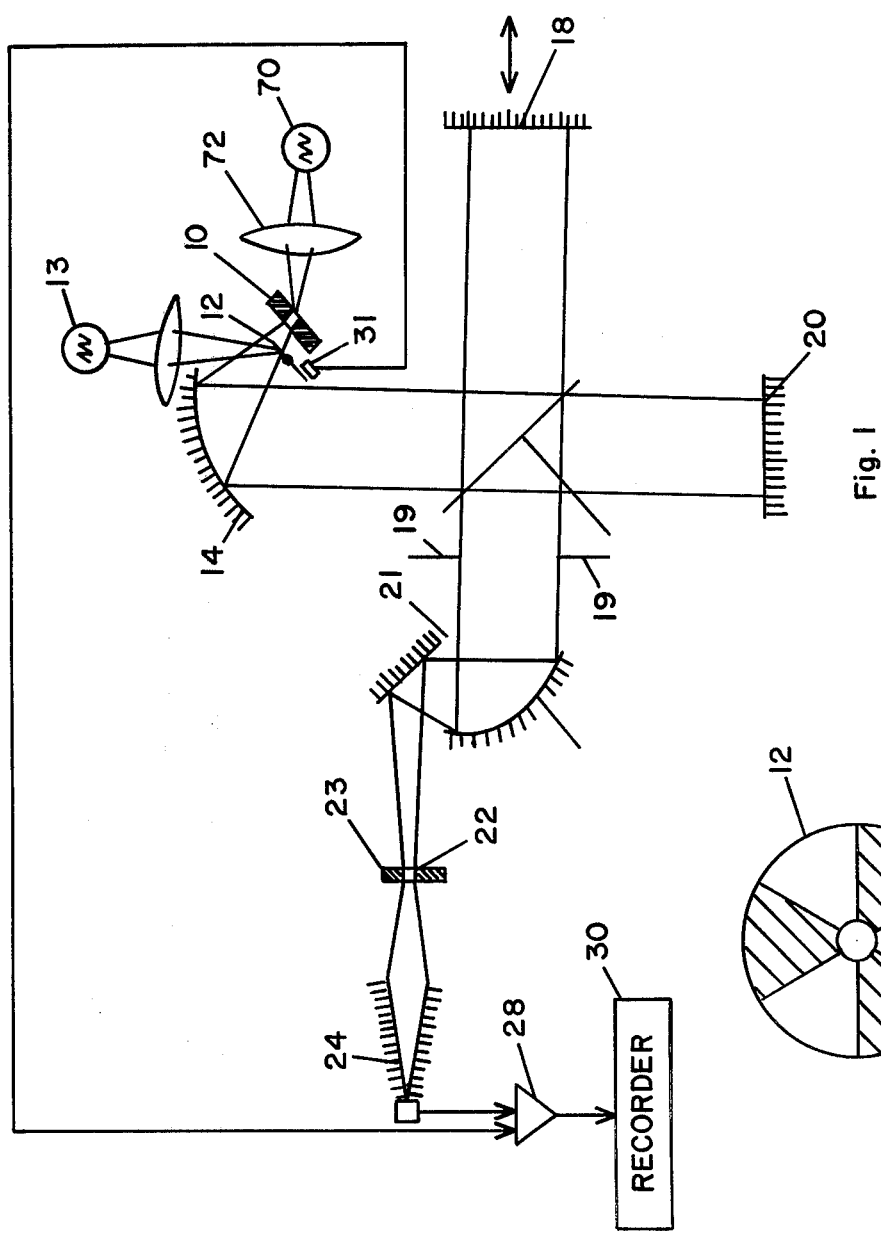

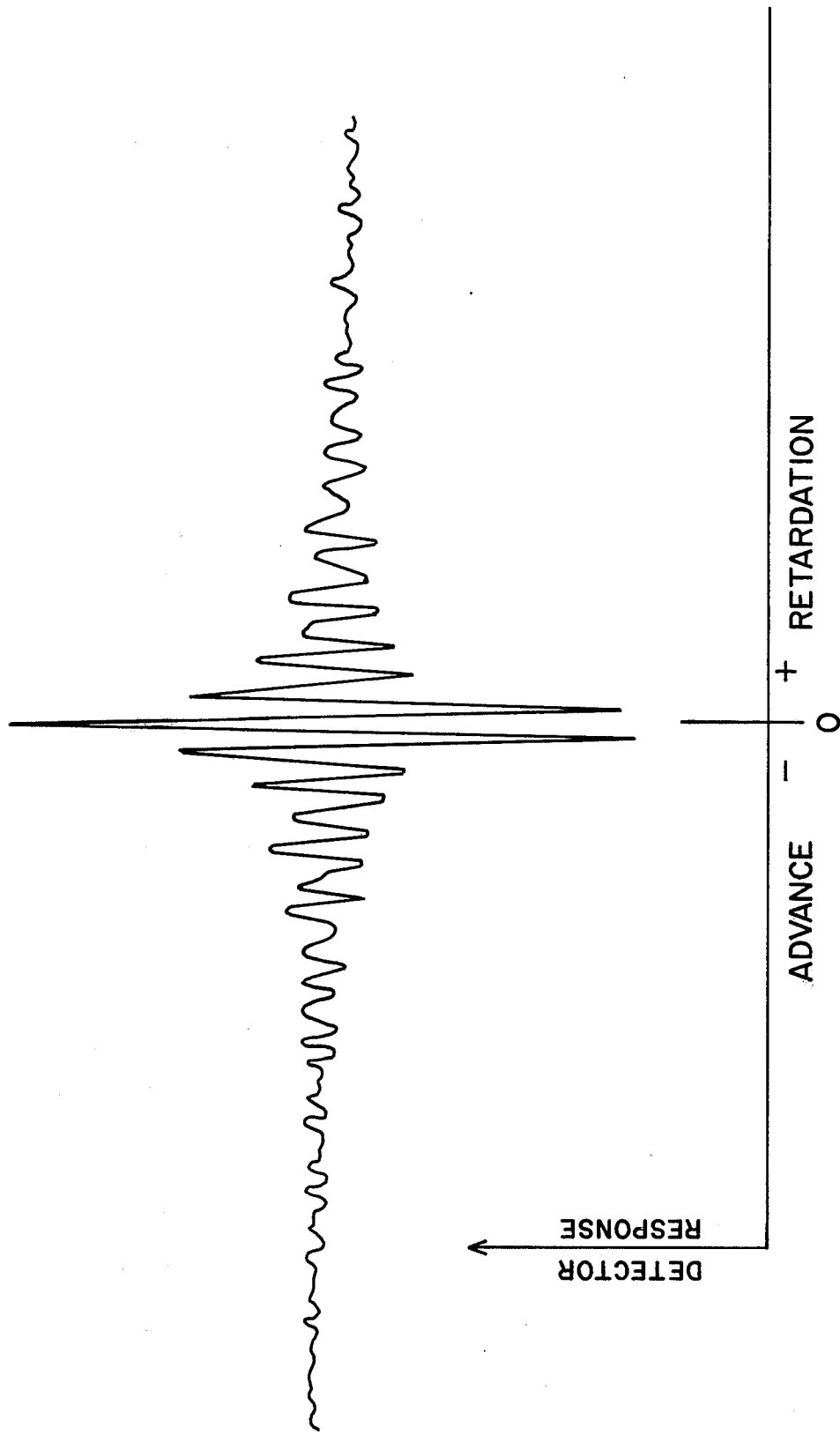

EMISSION SPECTROSCOPIC SYSTEM HAVING COMPENSATION FOR BACKGROUND RADIATION

BACKGROUND OF THE INVENTION

The present invention relates generally to emission spectroscopy, and more particularly relates to a spectroscopic system which is capable of separating radiation emitted by semi-transparent materials from graybody radiation emitted by opaque materials.

In many instances it is desirable to measure infrared radiation emitted from a particular material while disregarding radiation emitted from background materials. Infrared emission spectra often convey the same information as absorption spectra with respect to chemical composition, state, and thickness of many materials. One important aspect of emission spectra is its strong dependence on temperature, which is substantially greater than that of absorption spectra. This dependence has its origin in the temperature dependence of thermal radiation in general. By being able to establish the temperature of a material such as fluid film from the shape of its infrared emission bands, much of the doubt which now exists with respect to total radiation pyrometry will be removed. However, it is often extremely difficult to separate radiation emitted by a material such as a fluid from radiation emitted by metal parts, dust, metal fragments, etc.

One area in which it is desirable to detect emitted infrared radiation is in the contact region of a lubricant fluid with a simulated bearing contact. From simulated bearing contact, it is easier to detect emitted radiation than absorbed radiation as it is rather difficult to pass radiation through the bearing surface and the lubricant to a detector. With a simulated bearing contact, it would be desirable to determine the fluid and metal surface temperatures and also changes of fluid composition and state under various operating conditions. The infrared spectra of semi-transparent fluid films generally consist of discontinuous radiation of discrete bands, which are characteristic of the composition and state of the material, whereas infrared emission spectra of metallic surfaces are continuous, graybody radiation, and generally depend only upon temperature. It would be desirable to separate these composites of the spectra, as this would enable the accumulation of data on the fluid, and would allow deductions regarding the mechanisms of elastohydrodynamic (EHD) processes, particularly those leading up to failure.

The measurement of emitted infrared radiation is also desirable in other areas. The existence of geochemical fossils (hydrocarbons and other organic matter) in rock removed in drilling cores is frequently used as an indicator of the availability of oil and gas deposits further down in the earth's crust. The analysis of the kerogen in the form originally present in the rock is of particular interest. Extraction, pyrolosis, and other means of removing the organic matter from the rock for analysis often change the nature of these organic materials sufficiently so that important clues are lost. It would be desirable to be able to make an in situ, nondestructive analysis of the kerogen.

SUMMARY OF THE INVENTION

In accordance with a preferred embodiment, a system and method are disclosed of detecting discontinuous radiation emitted from a test object which is radiating both continuous and discontinuous radiation. Both the continuous and discontinuous radiation emitted from the test object are detected. Continuous radiation emitted from a second object is controlled to balance the continuous radiation detected from the second object with continuous radiation detected from the test object. The continuous radiation from the second object is then subtracted from the radiation of the test object such that the remainder is only the emitted discontinuous radiation of the test object. Further, in the preferred embodiment, a Michelson interferometer is utilized to measure the emitted radiation. Also in accordance with two disclosed embodiments, the test object or its image is positioned at the focal point of the collimating mirror of a Michelson interferometer. Further, in accordance with a preferred embodiment, the balancing referred to above is performed by rotating a modulating element in between the object under test or its image and the collimating mirror of a Michelson interferometer. Also, in one embodiment, the radiation emitted from the modulating element is controlled by accurately controlling its temperature. Also, in one embodiment the object being tested is a geochemical fossil having hydrocarbons and other organic matter which will emit discontinuous infrared radiation and also organic matter which will emit graybody radiation. In another embodiment, the input to the interferometer is an image of a lubricant fluid under test.

BRIEF DESCRIPTION OF THE DRAWINGS

FIG. 1 illustrates a Michelson interferometer in use as a spectrometer.

FIG. 2 shows one embodiment of the chopper blade shown in FIG. 1.

FIG. 3 illustrates a typical output for the instrument of FIG. 1.

DESCRIPTION OF A PREFERRED EMBODIMENT

Figure 4:
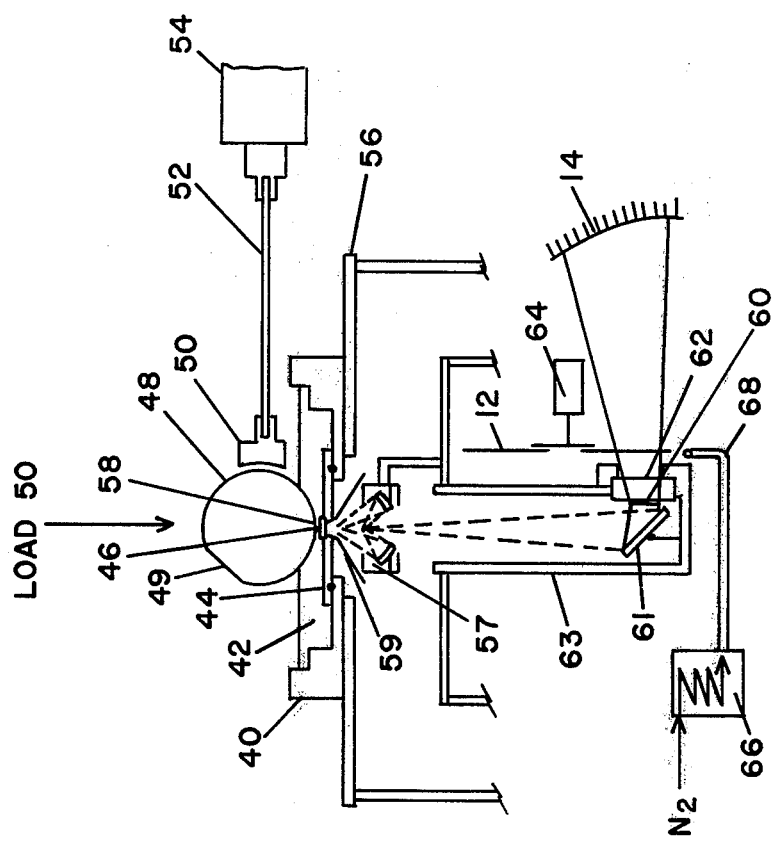
FIG. 4 shows one embodiment of the present invention.

Referring to FIG. 1 there is illustrated an interferometer for measuring the radiation emitted from a test object 10. An interferometer was chosen to measure the emitted radiation because of the small amount of radiation available for analysis. The measurement is a very delicate one, and as an example one calculation has shown that the measurement of radiation emitted by a fluid lubricant from an elastohydrodynamic (EHD) contact region in the presence of radiation emitted from a simulated ball bearing is equivalent to obtaining the weight of a ship's captain by weighing the ship with and without the captain on board. In one embodiment the interferometer was chosen to be an RIIC, FS720 far-infrared interferometer, available from Beckman Instruments.

A brief explanation of this interferometer will now be given. Radiation to be analyzed is emitted from a test object 10, and is mechanically chopped by a second object which may be an opaque rotating metal chopper disc 12 heated by a source 13 such that it emits graybody radiation. In other embodiments graybody radiation may be reflected off the chopper disc 12. The speed of rotation of the chopper depends upon the response time of the detector. In one embodiment where the detector was a Golay cell, the chopper was rotated at 5 Hertz. In other embodiments a vibrating tuning fork might replace the chopper. The modulation of the radiation is very important, and the reason for it will be explained later. It is then collimated by a mirror 14, and separated into two beams by a beamsplitter 16, such as a stretched film of Mylar. These beams are reflected by mirrors 18 and 20, the former being movable perpendicular to its plant, and are partially recombined by the beamsplitter 16. The recombined beam is then passed through a diaphragm 19 which is utilized to control the amount of radiation passing from the chopper 12 to a detector, and is then focused by mirrors 21 at an image position 22. For emission spectroscopy, an iris diaphragm 23 is positioned at the image to define the portion of the object 10, the emission spectrum of which is to be determined. Different zones of the object 10 being tested may be measured by moving the iris diaphragm 12 to different positions, if so desired. The radiation is then condensed by a condensing cone 24 and measured by a Golay detector 26, the output of which is directed to a phase sensitive amplifier 28, and then to a recorder 30. The phase sensitive amplifier is kept in phase with the chopper by a pick-up, such as a magnetic pick-up 31, placed adjacent to the chopper.

It should be noted that the spectrometer does not contain either a slit or a dispensing element such as a prism or a grating. Instead, scanning is done by moving mirror 18 along its axis, thus advancing or retarding the phase of the beam reflected by this mirror with respect to that reflected by the stationary mirror 20. When the two beams are later recombined and detected, their phase differences cause constructive or destructive interference, depending upon their frequencies. However, all frequencies combine constructively at the center burst, namely, that position of mirror 18 which is as far away from the beamsplitter 10 in terms of optical pathlength, as mirror 20. A typical interferogram showing the center burst and amplitude modulations is shown in FIG. 3. Note that the curve is almost perfectly symmetrical with respect to the center burst, as expected, since it should make no difference to the detector output whether the beam reflected by mirror 18 is retarded or advanced with respect to that reflected by mirror 20. The symmetry of the interferogram is an indication of good instrument alignment.

The base output of a Fourier spectrometer is a record of detector signal versus the distance of the scanning mirror from its zero position. Typically, readings of the detector are taken at precisely equal four micron distance intervals. Digital recording is standard for most commercial Fourier instrumentation as the conversion of the interferogram (FIG. 3) to a spectrum requires computer processing by a Fourier transformation. This transformation of the output data is typically carried out by a digital computer, and spectra are obtained in the usual representation as plots of wavelength or wavenumber versus spectral intensity. The entire process from the scanning to the spectral plots is typically automated.

As is pointed out in reviews on Fourier transform spectroscopy, the main reason for using this technique is the improvement of the signal to noise ratio by about two orders of magnitude over dispersive instrumentation. This improvement is ascribed to the throughput advantage (no slits and axial symmetry of the optics throughout) and the multiplex advantage (all frequencies transmitted by the optics simultaneously impinging on the detector). These advantages and the high sensitivity resulting from them can make the difference as to whether infrared emission spectra of weak sources may be recorded or not. However, two additional factors of a Fourier spectrometer were found to be invaluable for emission work: (a) The high dynamic range of the Fourier spectrometer, and (b) the availability of digital data amenable to extensive manipulation.

Whenever thermal radiation is discussed, the blackbody radiation laws are invariably introduced. Although described in terms of the discontinuous quantum, blackbody radiation is continuous with wavenumber. It shows no structure characteristic of the radiating material, and thus the spectral distribution of the radiation is a function of temperature only. Graybody radiation differs from blackbody radiation in terms of intensity, not structure. A thin fluid film may be considered to be semi-transparent. It emits radiation like a blackbody in those spectral regions in which it has a high absorptivity. Between absorption bands, where the absorptivity is low, a fluid film behaves like a transparent plate with low emissivity. Where the absorptivity has an intermediate value, the film emits like a graybody. Thus the infrared emission spectrum of an absorbing fluid film provides information about its composition in the same way that the infrared absorption spectrum does.

The basic relation governing thermal radiation from a partially transmitting and reflecting body is Kirchhoff's law which states that the sum of transmittance T, emissivity E, and reflectivity R is unity. Thus $$T + E + R = 1$$

Non-metallic (dielectric) surface layers generally have a low R and a high E, particularly at the wavenumbers of absorption bands, where our interest lies. Hence, R can be neglected for the radiating surface of fluid films. With these assumptions $$T = 1 - E, \text{ for every wavenumber,}$$

and a transmission spectrum can be calculated from an emissivity spectrum. The analysis of the transmission spectrum can then proceed along familiar lines, provided the temperature is known and can be considered uniform throughout the optical pathlength, which should also be known. It is clear from the above equation that at any wavenumber where the film is optically thick, (i.e. black), $T = 0$, just as it is for a strong absorption band. Conversely, at any wavenumber where the film is totally transparent, $T = 1$, again as expected. An emissivity spectrum of a fluid film can therefore be converted to an absorption spectrum at the same temperature.

Because of the absence of a separate source of strong continuous radiation, emission spectroscopy is much more difficult to carry out than absorption spectroscopy. The samples themselves are much weaker sources of radiation than the red-hot source of absorption spectroscopy. A fluid film can hardly be heated to a red glow, and accordingly an extremely sensitive method of spectral analysis and detection is required. Also, the need for the sample to be at a uniform temperature throughout cannot be overemphasized. Further, the temperature of the sample must be above ambient temperature for emission to occur. Strong emission bands are extremely sensitive to small temperature gradients in the sample.

Without the rotating disc 12, the interferometer shown in FIG. 1 would not produce an output signal as the total infrared radiation emitted by the test object 10 would be constant, and a Golay cell has a differential response (it responds to only differences in radiation). If the test object 10 contained both semi-transparent and graybody radiation emitting materials, the semi-transparent materials would emit radiation in discrete bands, while the other materials would emit graybody radiation, and the total output would be a sum of the two composites. In the particular applications for which this invention was developed, the discrete bands of radiation were of interest while the graybody radiation could be considered to be noise. Accordingly, a method of separating the two composites was desired. A second object in the form of the rotating metal disc 12 is utilized for this purpose. The rotating metal disc 12 also supplies graybody radiation. If the graybody radiation supplied by the disc 12 is controlled so that it is substantially the same as the graybody radiation emitted from the sample 10, as the disc interrupts the radiation passing into the interferometer, the interferometer will first see only graybody radiation and then see the same amount of radiation with the discrete bands superimposed thereon (depending upon the portion of the spectra being examined in the interferometer). Accordingly, the detector 26 of the interferometer is chosen to have a differential response to respond only to the difference between the radiant power emitted by the test object 10 and the radiant power emitted by chopper 12. These must be balanced. Since the spectral region examined by the spectrometer is narrow and the temperature difference between the chopper blade and the test object 10 is small, the slopes of the corresponding graybody or Planck curves are essentially equal. The desired operating condition is that point where modulation in the interference pattern is minimal, which is the condition of smallest center burst in the interferogram. Under the desired operating condition graybody radiation from the chopper has been balanced against graybody radiation from the test object, and a maximum signal of discontinuous radiation exists. This is adjusted for as will be explained later.

Maximum advantage from a Fourier spectrometer may be derived by using a very sensitive radiation detector. A Golay pneumatic detector is usually supplied with this particular instrument. Despite its slow response, fragile construction, and proneness to microphonics, it is well suited to infrared emission spectroscopy because of its high detectivity, which is essentially independent of frequency, and its differential response, i.e. the signal detected corresponds to the difference between the radiant power emitted by the source and that emitted by the chopper blade. (The Golay detector does not respond to a steady, i.e. dc, radiation signal.) The detector is operated at room temperature which is also convenient. The new low-noise Golay detector, IR 50, recently developed by Cathodeon of England constitutes a considerable improvement over the old one, for its uses a solid state preamplifier and has a detectivity so high that it approximates that of a photon noise limited ideal reactor. Its performance has proved to be excellent provided the entire Fourier spectrometer was supported on vibration-resistant mounts.

FIG. 4 illustrates a first derived embodiment of the present invention. This embodiment was designed to measure the radiation emitted in the EHD contact region of a lubricant fluid with a simulated bearing contact. A fluid cup 40 containing lubricant 42 to be tested includes a bottom steel plate 44 which has a small diamond window 46 therein. Diamond is a good window for use in most of the infrared spectrum region, as it does not absorb infrared radiation and also it is an excellent heat conductor. Since the body of the cell is a fairly massive block of steel compared to a 1 mm diameter window, (in one embodiment) and the sample fluid film is only tenths micrometers thick, a high degree of temperature uniformity was predicted. It should be mentioned that the surface film must be thin enough to give good emission bands, as the appearance of the spectrum from a thick layer of lubricant approaches the appearance of a blackbody spectrum. Accordingly the film should be thinner than one micrometer.

Returning to FIG. 4, a steel ball 48 having a small flat portion 49 is adapted to have a loading force 50 applied to it. The ball 48 is held by a ball holder 50 which is in turn rotated by a flexible shaft 52 which is coupled to a motor 54. The whole apparatus is supported by a bearing table 56. In operation the ball is rotated in the fluid bath and made to slide over the diamond window 46. The area of interest is the contact region 58 when the metal is elastically deformed and the lubricant film is extremely thin. The contact region is formed in the tiny fluid layer when the flattened portion of the ball rotates around into contact with the diamond surface. The contact region diameter is typically less than 0.3 mm.

In operation the fluid is heated by internal friction, a function of its viscosity, and its temperature is likely to be different from that of the metal ball. Also the radiant power emitted is likely to be weak, and accordingly it is necessary to collect as much radiation as possible from a wide solid angle. An aluminum heat shield 59 separates the area of interest from background radiation. Fortunately the high index of refraction of the diamond window is also helpful, as it moves the effective source of radiation away from the test contact region as shown in FIG. 4. The emitted radiation of the contact area is gathered by a Beck 15x reflecting microscope projector lens 57 which forms an enlarged real image of the heated sample at a position 60. Position 60 is located at the focal length of collimating mirror 14 of the spectrometer shown in FIG. 1, so that the image of the contact region, rather than the contact region itself, is the input into the spectrometer. The radiation from the image is directed by a mirror 61 through an infrared transparent window 62 in an adapter tube 63 to the interferometer collimating mirror 14. The rotating disc 12 is positioned just outside the window 62, and is driven by a motor 64. To balance the graybody radiation coming from the disc 12 with the graybody radiation emitted by the ball 48, the temperature of the disc 12 is precisely controlled by directing nitrogen a thermostatically controlled heat exchanger 66, and then directing it via a tube 68 against the surface of the rotating disc 12. The image at 60 fills only a portion of the aperture of the collimating mirror whereas in the illustrated embodiment the chopper blade fills the full aperture. It is possible by selectively restricting the area of the chopper blade in the aperture to balance the graybody radiation emitted by it with the radiation emitted by the test ball. For this purpose the temperature of the chopper blade is also controlled. The emissivity of the metal chopper 12 may be balanced against the emissivity of the test object 10 by varying any one of three parameters, its temperature, its area, or its emissivity, which is a function of the blade surface. In the embodiment illustrated in FIG. 4, the emissivity is controlled by controlling the area (by diaphragm 19) and temperature (by 66 and 68) of the chopper blade.

To obtain emission spectra from the contact region which are characteristic of the fluid composition, the graybody radiation emitted by the ball surface must be subtracted. However, in this embodiment the metal surface temperature is unknown. Depending upon the operation of the bearing, the metal surface temperature can be higher or lower than that of the fluid. The metal radiation has been successfully accounted for by making use of the fact that the Golay cell detector in the interferometer is extremely sensitive only to the difference between the radiation from the chopper blade and that of the test object. By varying the blade surface and changing its temperature by the stream of nitrogen, the radiation emitted by the ball surface can be effectively eliminated from the recorded spectrum. In this way, only the discontinuous spectra of the fluid is obtained. The ball surface temperature may be determined, if desired, from a suitable calibration as follows. For the calibration, rotation of the ball is stopped with the ball positioned directly against the window. The ball is then heated by circulating thermostatically controlled water through a coil in the lubricant. The temperature of the ball is then known, and its spectral response at the known temperature is recorded. This is repeated at several temperatures. Then, in operation of the apparatus the spectral responses at the same two frequencies are measured, and compared with those obtained in calibration experiments in which the ball surface was kept at known surface temperatures.

In a second embodiment of this invention, the spectrometer is utilized to perform an in situ analysis of a geochemical fossil, which may be taken to be the sample 10 in FIG. 1. In this embodiment the sample is sufficiently large and easily located right at the focal point of the collimating mirror 14. In this embodiment, the temperature of the fossil is controlled by a source of heat 70, the radiation of which is directed by a lens 72 against the back surface of the sample 10 to precisely control the temperature thereof. In other embodiments other heating means may be used. In practice the emission spectra of the core is obtained at several temperatures. This should enable an analysis of the principal constituents of the core. The results would then be utilized to evaluate the potential of further exploration.

Although at least one embodiment of the present invention has been described, the teachings of this invention will suggest many other embodiments to those skilled in the art.

The invention claimed is:
1. A method of detecting discontinuous radiation emitted from a test object which is radiating both continuous and discontinuous radiation and comprising the following steps:
   a. detecting both continuous and discontinuous radiation emitted from the test object;
   b. detecting continuous radiation emitted from a second object;
   c. balancing the radiation detected from said test and second objects such that the continuous radiation detected from said test and second objects are substantially equal; and
   d. subtracting the radiation detected from said second object from the radiation detected from said test object such that the remainder of the detected radiation from said test object is only substantially discontinuous radiation emitted therefrom.

2. A method as set forth in claim 1 where in said steps of detecting include the step of utilizing a Michelson interferometer.

3. A method as set forth in claim 2 and including the steps utilizing a Michelson interferometer having a collimating mirror at its input, and positioning the test object at the focal point of the collimating mirror.

4. A method as set forth in claim 2 and including the steps of utilizing a Michelson interferometer having a collimating mirror at its input, and forming an image of the test object at the focal point of the collimating mirror.

5. A method as set forth in claim 1 wherein said step of balancing includes the step of maintaining the second object at substantially the same temperature as said test object.

6. A method as set forth in claim 1 and including the step of utilizing a metal object as said second object.

7. A method as set forth in claim 6 and including the step of utilizing a rotating metal chopper blade having apertures as said second object and the step of detecting radiation from the test object through the apertures of said rotating chopper blade.

8. A method as set forth in claim 1 wherein the test object is a geochemical fossil and said step of detecting radiation from the test object includes the step of detecting both continuous and discontinuous radiation emitted from the geochemical fossil.

9. A method as set forth in claim 1 wherein said step of subtracting the radiation includes the step of utilizing a detector having a differential response which responds only to differences in radiation levels.

10. A system for detecting discontinuous radiation emitted from a test object which is radiating both continuous and discontinuous radiation and comprising:
   a. means for detecting both continuous and discontinuous radiation emitted from the test object;
   b. means for detecting continuous radiation emitted from a second object;
   c. means for balancing the radiation detected from said test and second objects to make substantially equal the continuous radiation detected from said test and second objects; equal; and
   d. means for subtracting the radiation detected from said second object from the radiation detected from said test object whereby the remainder of the detected radiation from said test object is only substantially discontinuous radiation emitted therefrom.

11. A system as set forth in claim 10 wherein said detecting means includes a Michelson interferometer.

12. A system as set forth in claim 11 and whereby both said detecting means include a Michelson interferometer having a collimating mirror at its input, and means for positioning the test object at the focal point of the collimating mirror.

13. A system as set forth in claim 11 and wherein both said detecting means include a Michelson interferometer having a collimating mirror at its input, and means for forming an image of the test object at the focal point of the collimating mirror.

14. A system as set forth in claim 10 and including means for maintaining the second object at substantially the same temperature as said test object.

15. A system as set forth in claim 10 and wherein said second object includes a metal object.

16. A system as set forth in claim 15 and including means for utilizing a rotating metal chopper blade having apertures as said second object; and said means for detecting radiation from the test object includes means for detecting radiation from the test object through the apertures of said rotating chopper blade.

17. A system as set forth in claim 10 wherein said test object is a geochemical fossil.

18. A system as set forth in claim 10 wherein said means for subtracting the radiation includes means for utilizing a detector having a differential response which responds only to differences in radiation levels.

* * * * *